G. W. TUCKER & W. L. ROORBACH.
BOTTLE STOPPER.
No. 10,881. Reissued Nov. 15, 1887.
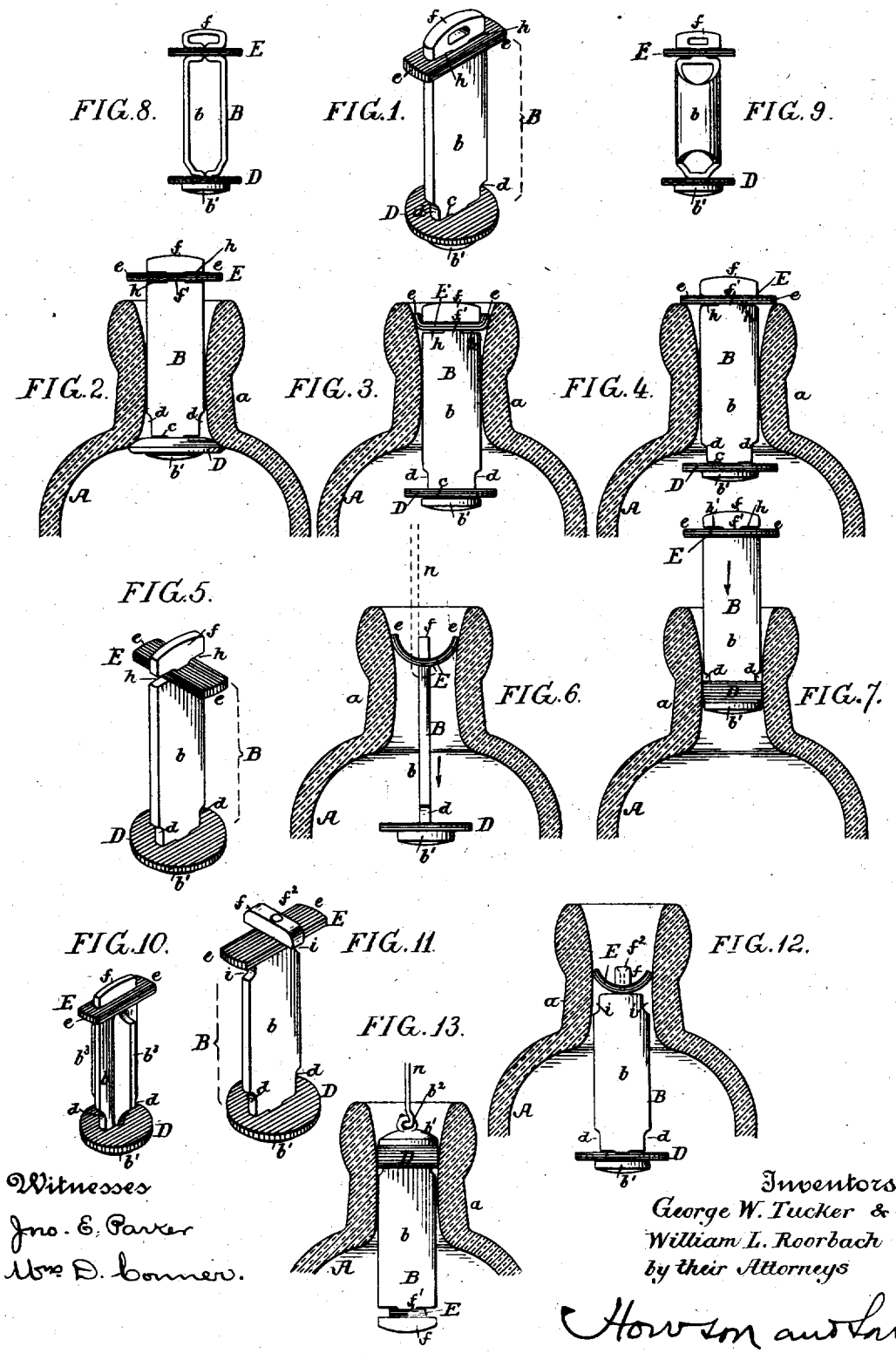
Witnesses
Jno. E. Parker
Wm. D. Conner.
Inventors
George W. Tucker &
William L. Roorbach
by their Attorneys
Howson and Sons
N. PETERS, Photo-Lithographer, Washington, D.C.

UNITED STATES PATENT OFFICE.

GEORGE W. TUCKER AND WILLIAM L. ROORBACH, OF PHILADELPHIA, PENNSYLVANIA.

BOTTLE-STOPPER.

SPECIFICATION forming part of Reissued Letters Patent No. 10,881, dated November 15, 1887.

Original No. 367,254, dated July 26, 1887. Application for reissue filed September 22, 1887. Serial No. 250,443.

*To all whom it may concern:*

Be it known that we, GEORGE W. TUCKER and WILLIAM L. ROORBACH, both citizens of the United States, and residents of Philadelphia, Pennsylvania, have invented certain Improvements in Bottle-Stoppers, of which the following is a specification.

The object of our invention is to so construct a bottle-stopper for gaseous liquids that, while the bottle can be filled when upright and the stopper closed by the pressure of the gases therein, said stopper can be readily adjusted to and will be self-retaining in such a position as to permit the escape of the liquid from the bottle, a further object being to permit the forcing of the stopper into the bottle when the latter is to be washed, and the ready returning of the stopper to its former position prior to filling, as fully described hereinafter.

In the accompanying drawings, Figure 1 is a perspective view of our improved bottle-stopper. Fig. 2 is a sectional view of the bottle with our improved stopper closing the mouth. Fig. 3 is a view showing the stopper forced down and retained in this position, so as to permit the pouring of the contents from the bottle. Fig. 4 is a view of the stopper in the position to which it is adjusted when the bottle is being filled. Fig. 5 is a perspective view of the stopper with part of the same in a different position from that shown in Fig. 1. Fig. 6 is a view showing the mode of forcing the stopper into the bottle. Fig. 7 is a view showing the mode of introducing the stopper in the first place; and Figs. 8 to 13, inclusive, are views of modified forms of stopper in accordance with our invention.

A is a bottle having a neck, *a*, and B is the stopper, comprising a flat stem, *b*, having near the lower end a sealing-disk, D, and near the upper end a frictional retainer, E. The stem of the stopper we prefer to make of rubber; but any suitable material which will withstand the strain to which it is subjected may be used, the sealing-disk and retainer being preferably of ordinary vulcanized rubber. The stem *b* has at the lower end a head, *b'*, and in the stem above said head are notches *c*, for the reception of the sealing-disk D, which is larger than the head *b'* of the stopper, and also larger than the mouth *a* of the bottle.

In order to permit the stopper to enter the bottle in the first place, as shown in Fig. 7, we form notches *d* in the stem *b* of the stopper directly above the disk, the latter, when it is turned up, as shown in Fig. 7, resting in these notches, so as to prevent the disk from binding in the neck of the bottle. The disk D is adapted to seat against the inner portion of the neck of the bottle, as shown in Fig. 2, the gases maintaining a constant pressure upon the disk from the inside of the bottle, so as to retain said disk in position for sealing the bottle. The upper portion of the stopper B has notches *h* in each side, so as to form a central pivot-pin, *f'*, and an elongated head, *f*, beyond the same. Between this head and the body of the stem we insert a flexible retaining-plate, E, which is narrow, as shown in Fig. 1, but of such length as to rest upon the mouth of the bottle and prevent the stopper from dropping into the same when the bottle is empty, as shown in Fig. 4.

When the bottle is to be filled with the liquid, the stopper is in the position shown in Fig. 7, the sealing-disk D being at some distance below its seat, so that any filler of the ordinary construction may be used for filling the bottle. As soon as the bottle is filled, however, the stopper assumes the position shown in Fig. 2, the disk D being forced up against its seat by the internal pressure of the gases.

When it is desired to open the bottle, the stopper is forced down to the position shown in Fig. 3, the flexible ends *e e* of the plate E being bent upward and being caused to bind firmly between the walls of the neck and the ends of the elongated head *f* of the stopper, thus retaining the latter in this position while the contents are being poured from the bottle. The retention of the stopper in this position prevents the splashing and uneven flow, which is an objection to this class of stoppers as usually made, and it also allows the bottle to be closed when only a portion of the liquid has been removed, the closing being effected by the simple lifting of the stopper until its sealing-disk is again seated.

When it is required to clean the bottle, the plate E is turned to the position shown in Fig. 5—that is to say, at right angles to the elongated head *f*—so that when the stopper is forced into the bottle the flexible ends of the plate are at liberty to bend at the sides of the head, so that the stopper can be readily forced into the bottle, as shown in Fig. 6, and when the bottle has been washed the stopper can be restored to its former position by means of a hook, *n*, (shown by dotted lines in Fig. 6,) said hook being adapted to catch under the plate E and withdraw the stopper from the interior of the bottle.

When it is required to remove the stopper from the bottle entirely, which is only necessary when a worn-out disk D has to be replaced, we cut the disk by any suitable tool, after which the stopper can be readily removed; or, if desired, the head $b'$ of the stopper may have a ring, $b^2$, formed on it, as shown in Fig. 13, in which case the disk D need not be cut, the stopper being reversed in the bottle and removed by a hook, *n*, engaging with the ring $b^2$, as shown in the figure mentioned above.

We have shown the stem of the stopper in the form of a flat plate; but said stem can be made of wire in skeleton form, as shown in Fig. 8, or in the form of a tube, as in Fig. 9, or can be made with wings $b^3$ at each side, as in Fig. 10, the forms shown in Figs. 9 and 10 tending to keep the stopper centrally in the neck of the bottle.

In Figs. 11 and 12 we have shown the head *f* pivoted to the stem portion of the stopper by a pivot-pin, $f^2$, the flexible retainer E being stationary on the stem *b*. This pivoting of the head *f* effects the same result as the pivoting of the retainer, for when it is desired to drop the stopper into the bottle the head *f* is turned on its pivot-pin, as shown in Fig. 11, so as to permit the stopper to be forced into the bottle, as shown in Fig. 12. We notch the upper portion of the stem *b* at *i i* in this case, so that the stopper can be readily pulled out of the bottle again to the position shown in Fig. 4.

We claim as our invention—

1. A bottle-stopper having a stem smaller than the neck of the bottle, and provided with a laterally-projecting flexible portion, which serves to hold the stopper in suspension while the bottle is being filled, and which may be jammed between the stem and the neck of the bottle, and thereby serve to keep the stopper in a depressed position to allow a pouring out of the contents of the bottle, all substantially as specified.

2. The combination, in a bottle-stopper, of a stem with an elongated flexible retainer and an elongated backing for the retainer, one movable with reference to the other, substantially as described.

3. The combination, in a bottle-stopper, of a stem with a sealing-disk at one end and an oblong flexible retainer at the opposite end, with an oblong backing for the retainer, one being movable with reference to the other, substantially as and for the purpose specified.

4. The combination, in a bottle-stopper, of the stem provided at one end with a sealing-disk and at the opposite end with an elongated head, and an elongated flexible retainer having a bearing against the elongated head, all substantially as set forth.

5. The combination, in a bottle-stopper, of the stem *b*, having a sealing-disk at one end and notched at the opposite end to form an elongated head, with an elongated flexible retainer fitted to and free to turn on the notched portion of the stem, and having a bearing against the elongated head, all substantially as described.

In testimony whereof we have signed our names to this specification in the presence of two subscribing witnesses.

GEORGE W. TUCKER.
WILLIAM L. ROORBACH.

Witnesses:
WILLIAM D. CONNER,
HARRY SMITH.